US006978316B2

(12) United States Patent
Ghaffar et al.

(10) Patent No.: US 6,978,316 B2
(45) Date of Patent: Dec. 20, 2005

(54) MESSAGING SYSTEM AND METHOD WITH TRANSCODER FILTERING OF BASELINE MESSAGE REPRESENTATIONS

(75) Inventors: Aamir Ghaffar, Marietta, GA (US); Patrick James Richards, Jr., Marietta, GA (US); John Wayne Ross, Jr., Atlanta, GA (US); Daniel Melvin Smith, Atlanta, GA (US); Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 10/107,785

(22) Filed: Mar. 27, 2002

(65) Prior Publication Data

US 2003/0187930 A1    Oct. 2, 2003

(51) Int. Cl.[7] ........................ G06F 15/16; G06F 17/00; G09G 5/00
(52) U.S. Cl. .................... 709/246; 709/204; 709/205; 709/206; 709/207; 715/522; 715/523; 345/581
(58) Field of Search ............................. 709/203–207, 709/220–222, 246, 245; 715/513, 522, 523, 715/529; 345/581

(56) References Cited

U.S. PATENT DOCUMENTS

| | | | | | |
|---|---|---|---|---|---|
| 5,848,415 | A | * | 12/1998 | Guck ........................... | 707/10 |
| 5,918,013 | A | * | 6/1999 | Mighdoll et al. ............ | 709/217 |
| 6,134,598 | A | * | 10/2000 | Raman ......................... | 709/246 |
| 6,185,625 | B1 | * | 2/2001 | Tso et al. .................... | 709/247 |
| 6,216,137 | B1 | * | 4/2001 | Nguyen et al. .............. | 707/203 |
| 6,421,733 | B1 | * | 7/2002 | Tso et al. .................... | 709/246 |
| 6,457,030 | B1 | * | 9/2002 | Adams et al. ............... | 715/523 |
| 6,584,567 | B1 | * | 6/2003 | Bellwood et al. ........... | 713/171 |
| 6,615,212 | B1 | * | 9/2003 | Dutta et al. .................... | 707/10 |
| 6,659,966 | B2 | * | 12/2003 | Essenpreis ................... | 600/583 |
| 6,704,024 | B2 | * | 3/2004 | Robotham et al. .......... | 345/581 |
| 6,715,129 | B1 | * | 3/2004 | Hind et al. .................. | 715/513 |
| 6,801,340 | B1 | * | 10/2004 | Endo .......................... | 358/403 |

OTHER PUBLICATIONS

Putz et al. "Secure Interoperation Between 2G and 3G Mobile Radio Networks". IEEE 3G Mobile Communication Technologies Conference Publication No. 471. 2000.*

* cited by examiner

Primary Examiner—Saleh Najjar
Assistant Examiner—Asad Muhammad Nawaz
(74) Attorney, Agent, or Firm—John R. Pivnichny; Dillon & Yudell LLP

(57) ABSTRACT

A messaging system and method suitable for use with wireless mobile terminals. The system includes a message server for receiving and sending messages and converting messages to a baseline such as an XML representation; a message processor for controlling the system's operation; a database for storing information about messaging capabilities of mobile terminals; and a transcoder for filtering the baseline representation according to the capability of a mobile terminal. A subscriber enters a profile that includes the messaging capability of the mobile terminal, which is stored in the database. When the server receives a message for the subscriber's terminal, it converts the message to the baseline. The transcoder filters the baseline according to the capability of the terminal, and returns the result to the server for format and protocol conversion and sending to the terminal.

14 Claims, 3 Drawing Sheets

MESSAGING SYSTEM AND METHOD WITH TRANSCODER FILTERING OF BASELINE MESSAGE REPRESENTATIONS

FIELD OF THE INVENTION

The present invention is related to the field of telecommunications, and more particularly to an improved electronic messaging technique that is suitable for use with wireless mobile terminals.

BACKGROUND

The advents of the Internet and wireless communication have changed public expectations about telecommunication services. The Internet has brought, among many benefits, the convenience and speed of electronic messaging such as electronic mail (email). At the same time, wireless communication has brought the convenience of mobility and nearly universal connectivity.

Cellular telephony, for example, has evolved from first-generation analog systems, to second-generation digital systems, then to "generation 2.5" systems that provide short-range wireless connectivity to wireline ports, and more recently to third-generation systems that promise to deliver high-bandwidth wireless connectivity. Parallel to this evolution, new messaging techniques have emerged, each appropriate for the mobile terminal technology of the time. Thus, messaging techniques have progressed from basic Short Message Service (SMS) through Enhanced Message Service (EMS), and soon on to Multimedia Message Service (MMS), where each step is richer in function but more complex and demanding than its predecessor.

However, as the capabilities of electronic messaging become more extensive, for example by enabling the attachment of various file types, for example images and other file types as well, to electronic messages, the limitations of mobile terminals that are ordinarily used for wireless communication become increasingly restrictive. These limitations result mainly from the need for small terminal size, which is inevitably accompanied by small displays and small keyboards, and from constraints on the extent to which radio spectrum, i.e., bandwidth, is available for wireless telecommunication services.

Measures have been adopted to help mitigate the limitations of wireless systems with mobile terminals. For example, sophisticated source-coding and channel-coding methods have been developed to conserve bandwidth, the Wireless Access Protocol (WAP) has been developed to reduce the complexity of providing Internet-like services on mobile terminals with small displays, and so forth.

Along the same general vein, new messaging formats and protocols are often made "backward compatible," so that a mobile terminal not equipped to take advantage of the full range of information provided by the latest messaging technique may nevertheless convey a useable subset of that information. Backward compatibility is provided by designing a new messaging technique so that a state-of-the-art mobile terminal may take advantage of all of the information carried by a message, but also so that an old terminal may accept and convey parts of the same message, and simply discard other parts of the message that lie beyond its messaging capability. For example, if an EMS message is sent to a mobile terminal that is capable of supporting only SMS messaging, the more complex information contained within the EMS message will simply be ignored (i.e., discarded) by the mobile terminal. Thus, by exploiting the nature of backward compatibility, each mobile terminal can select a subset of a message that falls within its messaging capability.

In addition, the messaging capabilities of mobile terminals are sometimes deliberately limited in order to keep the cost of the mobile terminal low or its size small. For example, a mobile terminal may have a monochromatic display rather than a full color display, a small display rather than a large display, and capability to support only Wireless BitMap (WBMP) images rather than images that are richer in content. In this case, backward compatibility enables a service provider to transmit all messages according to the newest messaging technique, and have confidence that a small or low-cost terminal deliberately provided with limited function, as well as an older mobile terminal, can still convey the gist of the message.

Unfortunately, transmitting a full message and relying on a mobile terminal to select a subset of the full message while discarding the rest consumes bandwidth unproductively. This is a significant shortcoming of reliance on backward compatibility, as bandwidth is an expensive resource whose availability fundamentally constrains the capacity of wireless communication systems. Such a waste of bandwidth may therefore result in a disincentive for service providers to adopt the latest messaging techniques, as subscribers with old or limited-function mobile terminals cannot rationally be expected to bear the cost of wasted bandwidth which provides no apparent benefit.

Consequently, there is a need for a way to provide inter-generational compatibility for messaging systems that does not waste bandwidth and yet enables a new messaging system to support mobile terminals that are either older or deliberately simpler than state-of-the-art terminals that are fully compatible with the new messaging system.

SUMMARY

The present invention provides inter-generational compatibility that does not waste bandwidth and yet enables a new-generation messaging system to support mobile terminals that are either older or deliberately simpler than state-of-the-art terminals that are fully compatible with the new messaging system.

One aspect of the invention is a messaging system. According to this aspect of the invention, a messaging system includes a message server for receiving and sending messages, for converting a received message to a baseline representation, and for converting a filtered baseline representation to a filtered message that conforms to the formats and protocols employed by a message recipient's mobile terminal; a message processor for assembling message routing information and mobile terminal messaging capabilities, and for generally coordinating the operation of the messaging system; a database for storing information concerning the messaging capabilities of mobile terminals; and a transcoder for filtering the baseline representation of a message according to the messaging capability of the message recipient's mobile terminal, thereby to provide a filtered baseline representation.

Another aspect of the invention is a messaging-system method. According to this inventive method, a subscriber of a messaging system, who is called here the "message recipient," provides the messaging system with a profile that includes information concerning the messaging capability of his or her mobile terminal. The profile is stored in the database, along with profiles provided by other message recipients. When the messaging system receives a message addressed to a mobile terminal, the messaging system identifies the mobile terminal, and reads the associated profile from the database to determine the mobile terminal's messaging capability. The messaging system converts the message to a baseline representation such as an XML representation of the message. The baseline representation is filtered to provide a filtered baseline representation that lies within the mobile terminal's messaging capability. The filtered baseline representation is then converted to a filtered message that conforms to the formats and protocols employed by the mobile terminal. The filtered message is then sent to the mobile terminal. Because the filtered message carries less information than its unfiltered antecedent, less bandwidth is required to send the message, and unuseable content is not sent to the mobile terminal only to be discarded.

Thus the invention provides, according to the inventive messaging-system method and messaging system, intergenerational compatibility that does not waste bandwidth and yet enables each new-generation messaging system to support mobile terminals that are either older or deliberately simpler than state-of-the-art terminals that are designed to be fully compatible with the new messaging system. These and other aspects of the present invention will be appreciated more fully when considered in the light of the following detailed description and drawings.

DETAILED DESCRIPTION

The present invention includes a messaging system and a messaging-system method. The messaging system comprises a message server for receiving and sending messages, for converting a received message to a baseline representation such as an XML representation, and for converting a filtered baseline representation to a filtered message that conforms to the formats and protocols employed by a message recipient's mobile terminal; a message processor for assembling message routing information and mobile terminal messaging capabilities, and for generally coordinating the operation of the messaging system; a database for storing information about the messaging capabilities of mobile terminals; and a transcoder for filtering the baseline representation of a message according to the messaging capability of a message recipient's mobile terminal, thereby to provide a filtered baseline representation.

A subscriber enters a profile that includes the messaging capability of his or her mobile terminal. The profile is stored in the database. When the messaging system receives a message addressed to the mobile terminal, the message server converts the message to the baseline representation, and passes the baseline representation to the message processor. The message processor gathers message routing information, reads the database to determine the messaging capability of the message recipient's mobile terminal, and passes the messaging capability and the baseline representation to the transcoder. The transcoder filters the baseline representation according to the messaging capability of the mobile terminal, to provide a filtered baseline representation, and returns the filtered baseline representation through the message processor to the message server. The message server converts the filtered baseline representation to a filtered message that conforms to the formats and protocols employed by the mobile terminal, and sends the filtered message to the mobile terminal. Because the filtered message has less information than the pre-filtered message, less bandwidth is required to send the filtered message to the mobile terminal.

Although more broadly applicable as well, the present invention is especially beneficial when the message is a "push" message, which means that the message is sent to the message recipient's terminal without requiring the recipient's terminal to explicitly request the message, i.e., without requiring the recipient's terminal to "pull" the message from a server.

Figure 1:
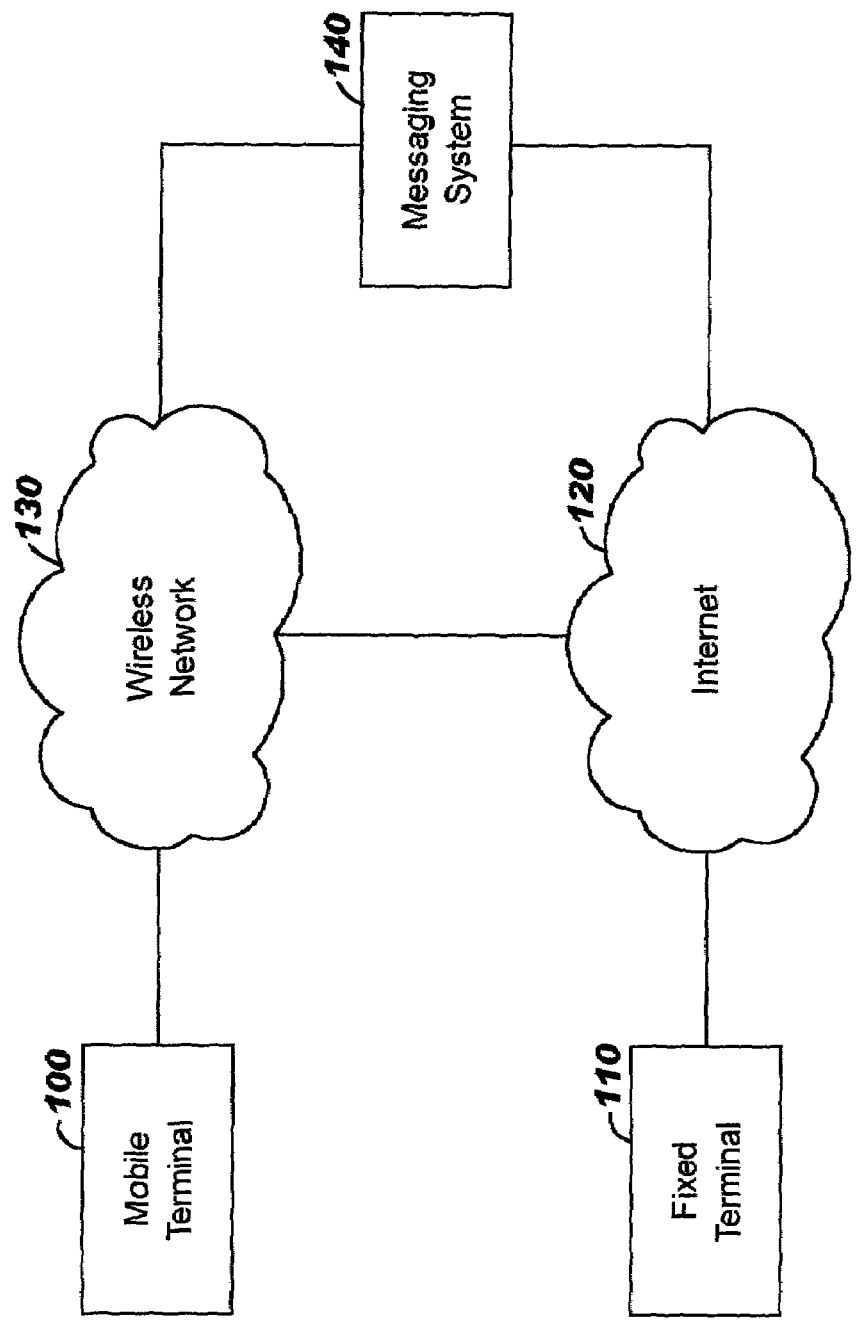
FIG. 1 is a block diagram that shows a context suitable for application of the present invention.

FIG. 1 is a block diagram that shows a context suitable for application of the present invention. In FIG. 1, a message originator using a fixed terminal 110 sends a message to a mobile terminal 100 used by a message recipient. It is important to note that the present invention applies as well to a mobile terminal sending a message to another mobile terminal, to a fixed terminal sending a message to another fixed terminal, and to a mobile terminal sending a message to a fixed terminal, and more generally that the distinction shown in FIG. 1 between the fixed terminal 110 and the mobile terminal 100 is maintained in the description herein only for the sake of clarity. Although FIG. 1 shows only one mobile terminal and one fixed terminal, the invention of course applies when more terminals are connected.

The fixed terminal 110, which may be a personal computer equipped with messaging software, may connect with the Internet 120; the mobile terminal 100, which may be a cellular telephone, a personal digital assistant, a laptop computer equipped with messaging software, and the like, may connect with a wireless network 130. Also shown in FIG. 1 is a messaging system 140, which may connect directly or indirectly with the Internet 120 and which may connect directly or indirectly with the wireless network 130. As an example of indirect connection, the messaging system 140 may connect with the wireless network 130 through the Internet 120.

Figure 2:
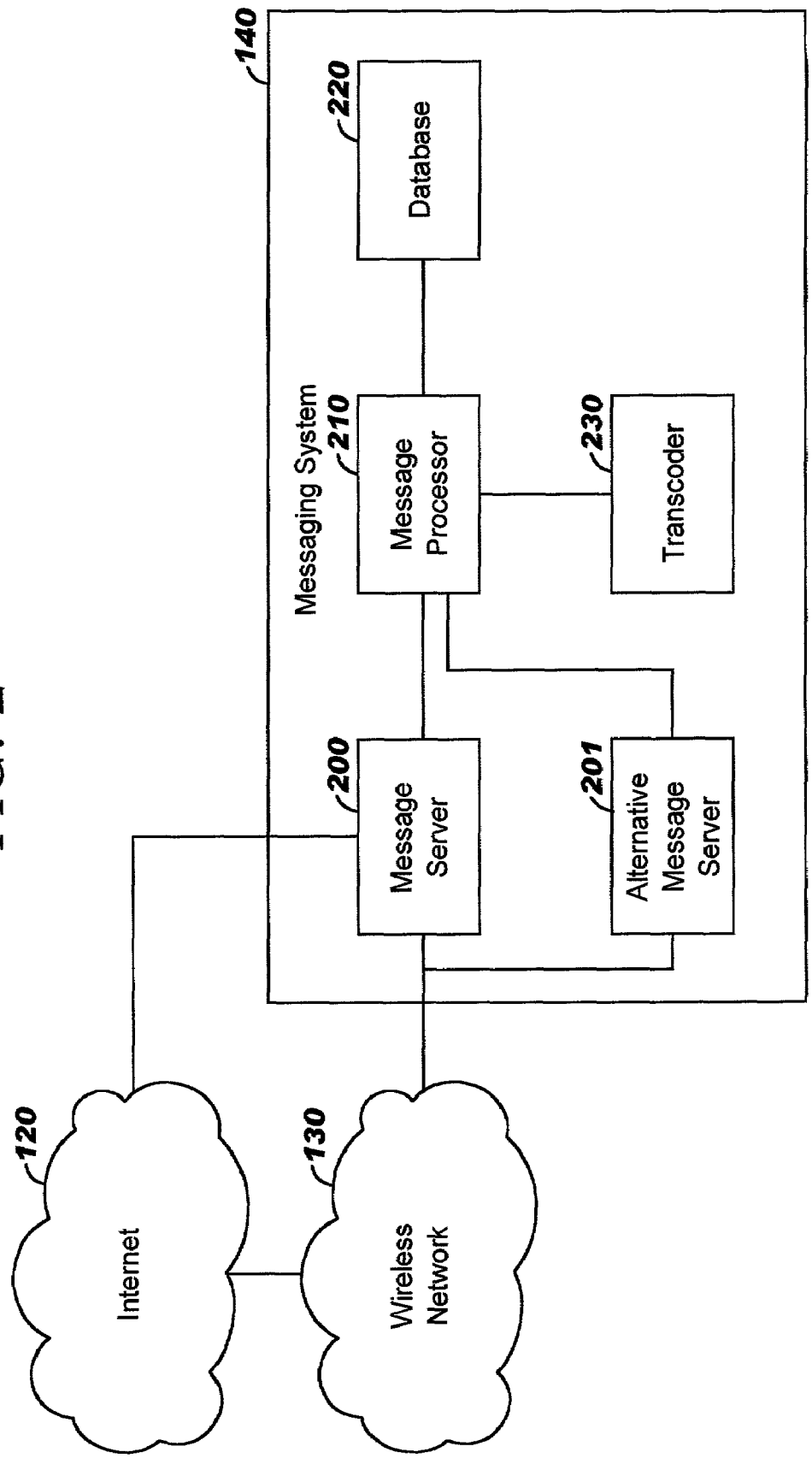
FIG. 2 is a block diagram that shows an exemplary structure embodying aspects of the invention.

FIG. 2 is a block diagram of an exemplary structure embodying aspects of the inventive messaging system 140. The messaging system 140, the operation of which is described in detail below, includes a message server 200 such as an email server, which may connect with the Internet 120 and with the wireless network 130. A message processor 210 is connected to the message server 200, and also to a database 220 and to a filter or transcoder 230. The particular structure shown in FIG. 2 is illustrative rather than limiting, however, and other structures that serve the same purpose will occur to those skilled in the art once taught the present invention. For example, the database 220 may be connected to the transcoder 230 rather than, or in addition to, the message processor 210; the message server 200 may be connected to the database 220 or the transcoder 230; and so forth. Also, the messaging system 140 may include an alternative message server 201, which may connect with the other components shown in FIG. 2 in the same way as the message server 200.

In a preferred embodiment of the invention, implementations of the message servers 200, 201 and the message processor 210 are based on programmable logic such as a microprocessors. Thus the separation of function between the message servers 200, 201 and the message processor 210 shown in FIG. 2 is a descriptive convenience rather than a limitation, and the functions of the message servers 200, 201 and the message processor 210 may be executed by a common processor in other embodiments of the invention.

In a preferred embodiment of the invention, the transcoder 230 is the IBM WebSphere Transcoding Publisher, version 4.0, which is available from the IBM Corporation, Armonk, N.Y. The IBM WebSphere Transcoding Publisher is server-based software that dynamically translates Web content and applications into multiple markup languages and optimizes the results for delivery to mobile devices, such as mobile phones and handheld computers, in order to bridge data across multiple formats, markup languages, and devices. The Transcoding Publisher adapts, reformats, and filters content to make it suited for pervasive computing. Web-Sphere is a Registered Trademark of the IBM Corporation.

Figure 3:
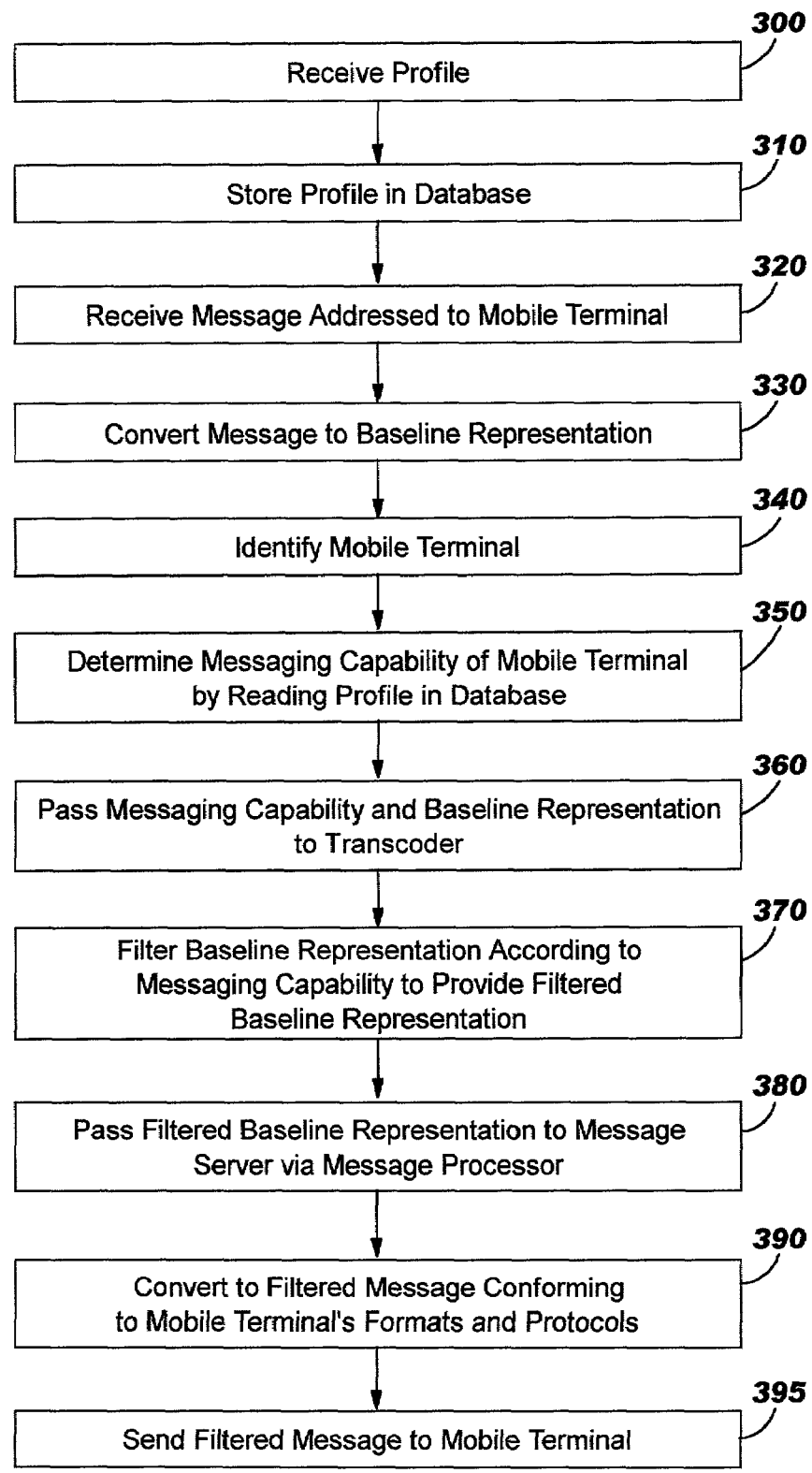
FIG. 3 is a flowchart that shows aspects of a method according to the present invention, suitable for use with the exemplary structure shown in FIG. 2.

FIG. 3 is a flowchart that shows aspects of a messaging-system method according to the present invention, suitable for use with the exemplary structure of FIG. 2. As shown in FIG. 3, a profile of the mobile terminal 100 is registered with the messaging system 140. The profile may be registered using the mobile terminal 100 itself, or by accessing a web page using another terminal such as a personal computer connected to the Internet 120, or in any other suitable way. The profile includes information about the messaging capability of the mobile terminal 100. For example, the profile may specify whether the mobile terminal 100 employs SMS, EMS, or MMS formats and protocols, whether the mobile terminal 100 has a color or monochromatic display, the size or size category of the display, and so forth. The profile is received by the message server 200, which passes the profile to the message processor 210 (step 300). In turn, the message processor 210 stores the profile in the database 220 for future reference (step 310).

When the messaging system subsequently receives a message addressed to the mobile terminal 100 (step 320), for example a message from the fixed terminal 110, the message server 200 converts the message to a baseline representation of the message (step 330). For example, the message server 200 may convert the message into a specified XML format through a simple custom-coded software extension. The message server 200 then passes the baseline representation to the message processor 210.

The message processor 210 examines the addressing of the message to identify the mobile terminal 100 intended to receive the message (step 340), and reads the appropriate profile in the database 220 to determine the messaging capability of the mobile terminal 100 (step 350). The message processor 210 then transfers the baseline representation of the message and the messaging capability of the mobile terminal 100 to the transcoder 230 (step 360).

The transcoder 230 filters the baseline representation of the message to remove information that cannot be processed effectively by the mobile terminal 100 (step 370), thereby providing a filtered baseline representation that lies within the messaging capability of the mobile terminal 100. For example, the message may be an email message with an image and a word processor document attached. If the profile identifies the mobile terminal 100 as a cellular telephone having SMS capability, the transcoder 230 may provide a filtered baseline representation that contains the subject line of the email message, identification of the originator of the message, and names of the two attachments. On the other hand, if the profile identifies the mobile terminal 100 as a personal digital assistant with more advanced messaging capability but a relatively small monochromatic display, the transcoder 230 may provide a filtered baseline representation that includes the full email text, the full word processor document, and a scaled-down representation of the image. The transcoder 230 returns the filtered baseline representation to the message processor 210, which forwards the filtered baseline representation to the message server 200 (step 380).

The message server 200 converts the filtered baseline representation to a filtered message that conforms to the formats and protocols employed by the mobile terminal 100 (step 390), and sends the filtered message to the mobile terminal 100 (step 395). Because content has been removed from the filtered message, less bandwidth is required to send the filtered message to the mobile terminal 100 than would have been required had the message not been filtered.

As mentioned above, the message server 140 may include an alternative message server 201. The alternative message server 201 may convert the filtered baseline representation to a filtered message that conforms to a set of formats and protocols not necessarily supported by the message server 200. When the appropriate conversion capability lies within the alternative message server 201 rather than the message server 200, the message processor 210 may return the filtered baseline representation to the alternative message server 201 for conversion to a filtered message, rather than to the message server 200. More generally, a message may be received by a first message server and processed as described above, but converted to a filtered message and sent to the mobile terminal by a second message server, where the first and the second message servers support different messaging techniques, different formats and protocols, and the like. In this way, a common, or a commonly designed, message processor 210, database 220, and transcoder 230 may conveniently support a wide variety of message servers without incurring undue complexity.

From the foregoing description, those skilled in the art will recognize that the present invention provides inter-generational messaging compatibility that does not waste bandwidth and yet enables a new-generation messaging system to support mobile terminals that are either older or deliberately simpler than state-of-the-art terminals designed to be fully compatible with the new messaging system. The foregoing description is illustrative rather than limiting, however, and the present invention is limited only by the following claims.

We claim:
1. A method comprising:
receiving, at a first message server, an e-mail message that is formatted in a second generation messaging format;
consulting, at the first message server, a database that identifies a mobile device as using a first generation messaging format, wherein the first generation messaging format is a legacy of the second generation messaging format, and wherein the second generation messaging format enables a transmission and use of information features that are unusable by the first generation messaging format due to the first generation messaging format lacking technical features that are found in the second generation messaging format, and wherein the messaging formats are exclusively from a group that includes Short Message Service (SMS), Enhanced Message Service (EMS) and Multimedia Message Service (MMS), wherein SMS is a legacy of EMS, and wherein EMS is a legacy of MMS;
converting, at the first message server, the e-mail message into a baseline extensible markup language (XML) representation of the e-mail message to create a converted e-mail message;

based on the messaging format used by the mobile device, filtering out, at the first message server, all unusable content from the converted e-mail message to create a filtered e-mail message, wherein the unusable content is second generation messaging formatted content that is unusable by the mobile device that uses the first generation messaging format;

based on which messaging format is used by the mobile device, transcoding, at the first message server, the filtered e-mail message into a final e-mail message using SMS, EMS or MMS;

transmitting the final e-mail message without the unusable content from the first message server to a second message server, wherein the second message server utilizes only the first generation messaging format; and transmitting the final e-mail message without the unusable content from the second message server to the mobile device, wherein the first message server is capable of transcoding e-mail messages in multiple earlier generation messaging formats, and wherein the first message server is capable of supporting multiple servers that use only earlier generation messaging formats, and wherein the first message server is not in communication with the mobile device.

2. The method of claim 1, wherein the unusable content includes a full text of an attachment to the final e-mail message, and wherein the final e-mail message includes a name, originator and subject line of the attachment that was excluded from being transmitted to the mobile device by virtue of being included in the unusable content, such that the full text, which is unreadable in the mobile device due to technical limitations of the first generation messaging format, is not transmitted to the mobile device, thus saving transmission bandwidth between the second message server and the mobile device.

3. The method of claim 1, wherein the mobile client device is a cell phone.

4. The method of claim 1, wherein the mobile client device is a Personal Digital Assistant (PDA).

5. The method of claim 1, wherein the first generation messaging format is Short Message Service (SMS) and the second generation messaging format is Enhanced Message Service (EMS).

6. The method of claim 1, wherein the first generation messaging format is Enhanced Message Service (EMS) and the second generation messaging format is Multimedia Message Service (MMS).

7. The method of claim 1, wherein the database is based on a profile of a subscriber who is authorized to use the mobile device.

8. A system comprising:

means for receiving, at a first message sever, an e-mail message that is formatted in a second generation messaging format;

means for consulting, at the first message server, a database that identifies a mobile device as using a first generation messaging format, wherein the first generation messaging format is a legacy of the second generation messaging format, and wherein the second generation messaging format enables a transmission and use of information features that are unusable by the first generation messaging format due to the first generation messaging format lacking technical features that are found in the second generation messaging format, and wherein the messaging formats are exclusively from a group that includes Short Message Service (SMS), Enhanced Message Service (EMS) and Multimedia Message Service (MMS), wherein SMS is a legacy of EMS, and wherein EMS is a legacy of MMS;

means for converting, at the first message server, the e-mail message into a baseline extensible markup language (XML) representation of the e-mail message to create a converted e-mail message;

means for, based on the messaging format used by the mobile device, filtering out, at the first message server, all unusable content from the converted e-mail message to create a filtered e-mail message, wherein the unusable content is second generation messaging formatted content that is unusable by the mobile device that uses the first generation messaging format;

means for, based on which messaging format is used by the mobile device, transcoding, at the first message server, the filtered e-mail message into a final e-mail message using SMS, EMS or MMS;

means for transmitting the final e-mail message without the unusable content from the first message server to a second message server, wherein the second message server utilizes only the first generation messaging format; and means for transmitting the final e-mail message without the unusable content from the second message server to the mobile device, wherein the first message server is capable of transcoding e-mail messages in multiple earlier generation messaging formats, and wherein the first message server is capable of supporting multiple servers that use only earlier generation messaging formats, and wherein the first message server is not in communication with the mobile device.

9. The system of claim 8, wherein the unusable content includes a full text of an attachment to the final e-mail message, and wherein the final e-mail message includes a name, originator and subject line of the attachment that was excluded from being transmitted to the mobile device by virtue of being included in the unusable content, such that the full text, which is unreadable in the mobile device due to technical limitations of the first generation messaging format, is not transmitted to the mobile device, thus saving transmission bandwidth between the second message server and the mobile device.

10. The system of claim 8, wherein the mobile client device is a cell phone.

11. The system of claim 8, wherein the mobile client device is a Personal Digital Assistant (PDA).

12. The system of claim 8, wherein the first generation messaging format is Short Message Service (SMS) and the second generation messaging format is Enhanced Message Service (EMS).

13. The system of claim 8, wherein the first generation messaging format is Enhanced Message Service (EMS) and the second generation messaging format is Multimedia Message Service (MMS).

14. The system of claim 8, wherein the database is based on a profile of a subscriber who is authorized to use the mobile device.

* * * * *